(12) United States Patent
Nakamura

(10) Patent No.: US 8,477,416 B2
(45) Date of Patent: Jul. 2, 2013

(54) STEREOMICROSCOPE

(75) Inventor: Katsushige Nakamura, Tokyo (JP)

(73) Assignee: Mitaka Kohki Co., Ltd., Tokyo (JP)

( * ) Notice: Subject to any disclaimer, the term of this patent is extended or adjusted under 35 U.S.C. 154(b) by 401 days.

(21) Appl. No.: 12/746,655

(22) PCT Filed: Dec. 9, 2008

(86) PCT No.: PCT/JP2008/072343
§ 371 (c)(1),
(2), (4) Date: Jun. 7, 2010

(87) PCT Pub. No.: WO2009/075268
PCT Pub. Date: Jun. 18, 2009

(65) Prior Publication Data
US 2010/0259815 A1  Oct. 14, 2010

(30) Foreign Application Priority Data

| Dec. 11, 2007 | (JP) | 2007320228 |
| Dec. 11, 2007 | (JP) | 2007320229 |
| Jun. 2, 2008 | (JP) | 2008144798 |
| Jun. 2, 2008 | (JP) | 2008144808 |

(51) Int. Cl.
*G02B 21/22* (2006.01)

(52) U.S. Cl.
USPC .......................................... 359/376; 359/378

(58) Field of Classification Search
USPC .................................................. 359/374–378
See application file for complete search history.

(56) References Cited

U.S. PATENT DOCUMENTS
2004/0165258 A1 * 8/2004 Yamashita .................... 359/378

FOREIGN PATENT DOCUMENTS

| JP | 08290280 A | 11/1996 |
| JP | 2001046399 A | 2/2001 |
| JP | 2001208979 A | 8/2001 |
| JP | 2003195181 A | 7/2003 |
| JP | 2004145372 A | 5/2004 |
| JP | 2004163413 A | 6/2004 |

OTHER PUBLICATIONS

Machine translation of JP 2001-046399 (from http://www4.ipdl.inpit.go.jp/).*
International Preliminary Report (English Translation), PCT/JP2008/072343 (6 pages).
International Search Report, PCT/JP2008/072343 (5 pages).

* cited by examiner

*Primary Examiner* — Frank Font
(74) *Attorney, Agent, or Firm* — Edell, Shapiro & Finnan, LLC

(57) ABSTRACT

A stereomicroscope has a rotary mirror to switch an optical path of a beam from an objective optical system between a normal optical path A and an image optical path B. Accordingly, a main operator D1 can keep his or her eyes on eyepieces 15 when switching an optical image through the normal optical path A and an electronic image through the image optical path B from one to another. A zooming optical system 10 is horizontally arranged in the normal optical path A and a high-magnification optical path C is formed on a horizontally outer side of the zooming optical system 10, to reduce a vertical dimension of a body of the microscope and secure a wide work space.

5 Claims, 15 Drawing Sheets

STEREOMICROSCOPE

TECHNICAL FIELD

The present invention relates to a stereomicroscope capable of allowing one's eyes to be kept on eyepieces when switching a normal stereoscopic optical observation to a stereoscopic image observation.

BACKGROUND TECHNOLOGY

A stereomicroscope used for, for example, brain surgery takes in a beam for the right eye and a beam for the left eye reflected by a target through an inlet formed at a lower part of a body of the microscope, guides the beams through an objective optical system and a zooming optical system to left and right eyepieces, and enables an optical image of the target to be stereoscopically observed through the eyepieces.

A related art in recent years makes various fluorescent materials (talaporfin sodium, indocyanine green, and the like) collect at a target, irradiates the target with excitation light having wavelengths for the fluorescent materials, photographs fluorescence emanated from the target with a CCD camera through filters, and displays for observation the photographed fluorescence image on a monitor aside from a microscope. Japanese Unexamined Patent Application Publication No. 2004-163413 discloses an apparatus for displaying and observing left and light fluorescence images on a special scope.

A zooming optical system interposed in an optical path deteriorates an image resolution as magnification increases. To avoid this, there is a stereomicroscope that forms, by bypassing the zooming optical path, a high-magnification optical path for providing a high-magnification clear image and switches, as and when required, a normal optical path passing through the zooming optical path to the high-magnification optical path of a fixed high magnification not passing through the zooming optical path. The stereomicroscope of this kind is disclosed in, for example, Japanese Unexamined Patent Application Publication No. 2003-195181 that arranges an objective optical system and a zooming optical system in a vertical direction and a high-magnification optical path in parallel with the zooming optical system in the vertical direction.

DISCLOSURE OF INVENTION

The related art, however, displays a fluorescence image on a monitor or scope that is separate from a microscope. To view the fluorescence image, an observer of the microscope must bother to turn away from eyepieces of the microscope. If it is during an operation, the operation must be suspended to elongate an operation time.

In addition, the related art that forms a zooming optical path and high-magnification optical path in a vertical direction enlarges vertical dimensions of the microscope to restrict work dimensions between the microscope and an observation target.

Means to Solve the Problems

In consideration of these related arts, the present invention provides a stereomicroscope capable of allowing the eyes to be kept on eyepieces when stereoscopically viewing an electronic image. The present invention also provides a stereomicroscope capable of reducing vertical dimensions of a body of the microscope and realizing compactness.

According to a first aspect of the present invention, the stereomicroscope includes a normal optical path to guide a pair of left and right beams traveling through an objective optical system to left and right eyepieces, a photographing optical path branched from the normal optical path and extending to a camera that introduces branched beams and photographs a pair of electronic images having binocular parallax, an image optical path to guide images on a pair of left and right small monitors displaying the electronic images photographed by the camera to the left and right eyepieces, and a first total reflection optical element to optionally switch the normal optical path and image optical path from one to another and guide the chosen one to the eyepieces.

According to a second aspect of the present invention, the stereomicroscope further includes a zooming optical system horizontally arranged along the normal optical path, a high-magnification optical path branched from the normal optical path and bypassing the zooming optical path, a fixed-high-magnification optical system horizontally arranged along the high-magnification optical path on a horizontally outer side of the zooming optical system, and a second total reflection optical element to optionally switch the beams introduced into the objective optical system between the normal optical path and the high-magnification optical path.

BEST MODE OF IMPLEMENTING INVENTION

First Embodiment

Figure 1:
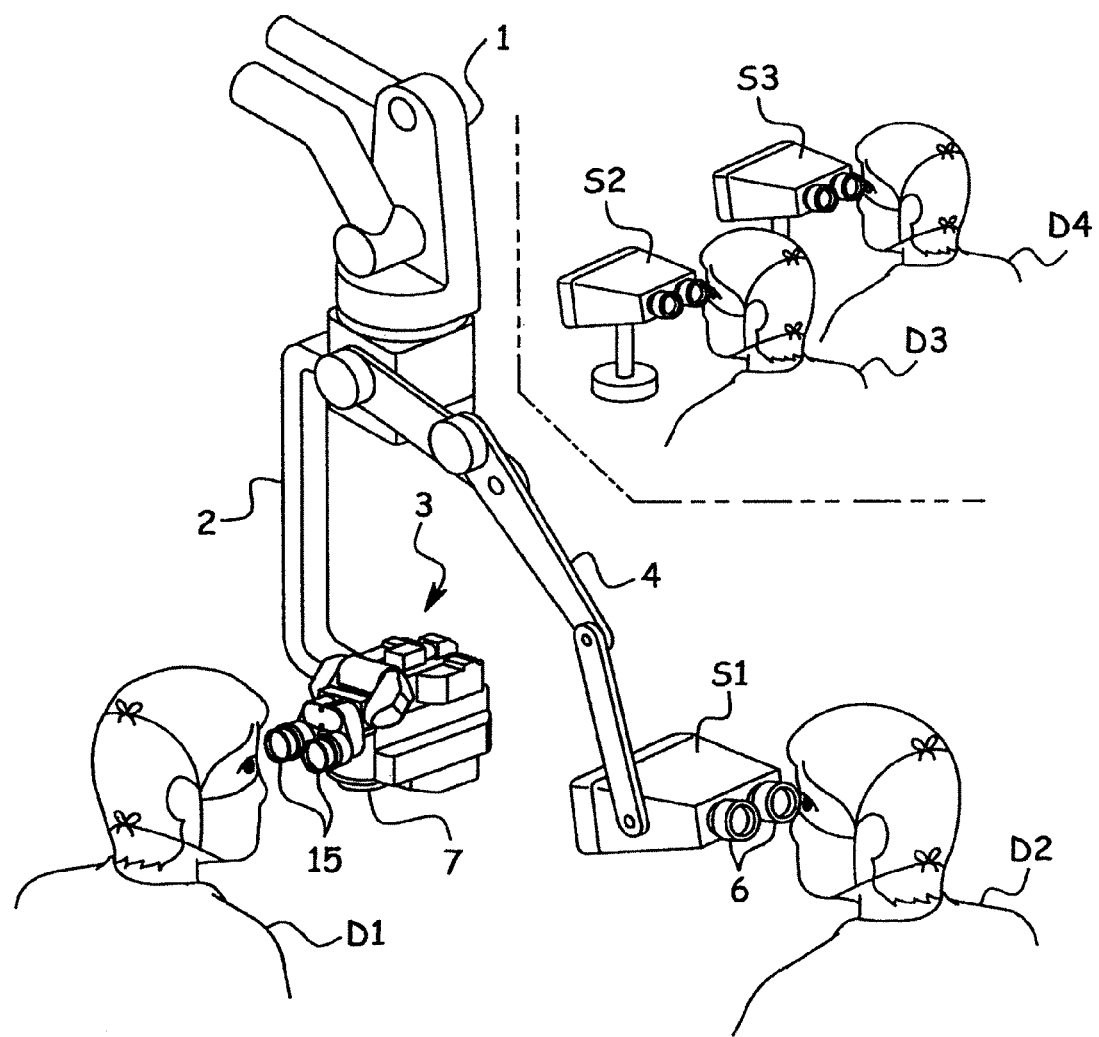
FIG. 1 is a perspective view illustrating a stereomicroscope and stereo viewers according to an embodiment of the present invention.
Figure 2:
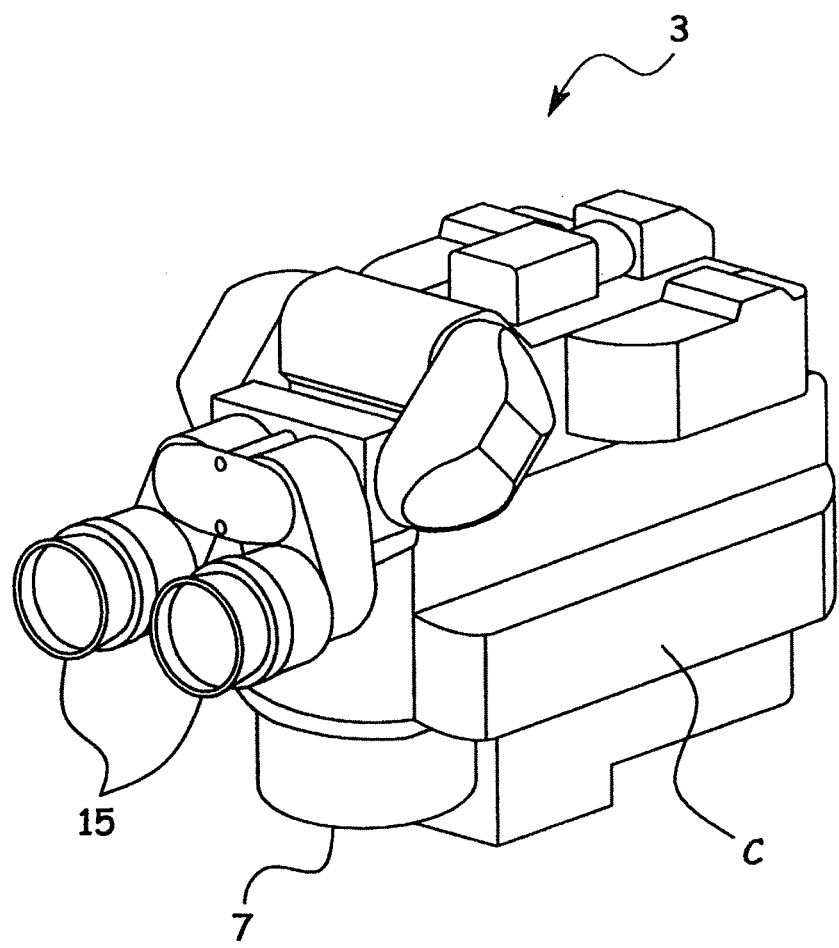
FIG. 2 is a perspective view illustrating the stereomicroscope.

The first preferred embodiment of the present invention will be explained with reference to FIGS. 1 to 18. A stand apparatus, which is installed on the floor of an operation room and is not illustrated, has a front link 1 having a support aim 2 substantially having a C-shape. A lower end of the support arm 2 supports a stereomicroscope 3 for a main operator D1.

Supported on the right side of the stereomicroscope 3 is a stereo viewer S1 for an assistant D2 who positions on the right side of the main operator D1. The stereo viewer S1 is supported with a hold arm 4 extending from the front link 1. The stereo viewer S1 incorporates a pair of display monitors (liquid crystal display panels) 5 to view an electronic image of a target T displayed thereon through eyepieces 6. The liquid crystal display panel (LCD) maybe of a reflection type or a transmission type.

At a different location in the operation room, other stereo viewers S2 and S3 are arranged and are viewed by a nurse D3, an intern D4, and the like.

<Normal Optical Path A>

A pair of left and right normal optical paths A are formed for stereoscopic observation. At a lower part of the stereomicroscope 3, a beam intake 7 is formed. On the beam intake 7, an objective optical system 8 having a lens group is formed in a vertical direction (a top-bottom direction on the drawing). At the top of the objective optical system 8, prisms 9 serving as a "magnification switching element" are arranged. Arranged rearward from the prisms 9 is a zooming optical system 10 (variable within 4 to 24 magnifications) having a main axis oriented in a horizontal direction (a left-right direction on the drawing). The prisms 9 are horizontally turnable by 90° around vertical axes 9V that are parallel to an optical axis of the objective optical system 8.

On a rear side of the zooming optical system 10, there are beam splitters 11. The beam splitters 11 upwardly branch the normal optical paths A, which are bent through two prisms 12 toward a front side and are guided through notch filters F to eyepieces 15.

Namely, the normal optical paths A extend from the top of the objective optical system 8 in such a way as to separate rearward from the optical axis of the objective optical system 8, are upwardly bent by the beam splitters 11, are forwardly bent by the prisms 12, and reach the eyepieces 15. Accordingly, the bent normal optical paths A approach the main axis of the objective optical system 8.

The normal optical paths A straightly advance as photographing optical paths R from the beam splitters 11. Thereafter, the optical paths R are upwardly bent in a vertical direction in parallel with the normal optical paths A, are again forwardly bent, and reach a camera 16. At the vertically extending part of the photographing optical paths R, a photographing optical system 17 is arranged. The camera 16 has a stereo adapter of a related art (for example, Japanese Patent No. 2607828), and only by itself, is capable of simultaneously photographing an electronic image for the right eye and an electronic image for the left eye. Taking electronic images with the single camera 16 or a single imaging element (such as a CCD image sensor) needs no sensitivity adjustment between two cameras and makes photographing easier.

<Image Optical Path B>

Between the prisms 12 and the notch filters F in the normal optical paths A, there are rotary mirrors 18 serving as a "total reflection optical element" that turn around end vertical axes (virtual axes) 18V to freely enter into the normal optical paths A at an angle of 45°. From a part corresponding to the rotary mirrors 18, the image optical paths B are branched to reach small monitors 21. Namely, the normal optical paths A and image optical paths B are optionally switched between them by the rotary mirrors 18 and are guided to the eyepieces 15. The image optical paths B each involve a lens 19 and a fixed mirror 20, to guide an image on the small monitor 21 into the normal optical path. The rotary mirror 18 is structured only to turn substantially at the same position around the end vertical axis 18V, and therefore, is installable in a limited space in the stereomicroscope 3.

According to the present embodiment, the small monitor 21 is a one-inch reflection LCD. The small monitor 21 has a light source P of white LEDs to irradiate a screen. The light source P is turned on when the rotary mirrors 18 are turned to function the image optical paths B.

The reflection LCD is structurally easy to miniaturize compared with a transmission LCD having a backlight, and therefore, is preferable to arrange in a narrow internal space of the stereomicroscope 3. Compared with the transmission LCD, the reflection LCD has a smaller gap between pixels to make black grids inconspicuous and realize higher image quality. The transmission LCD, however, has been improved, and therefore, is usable in place of the reflection LCD.

Figure 18:
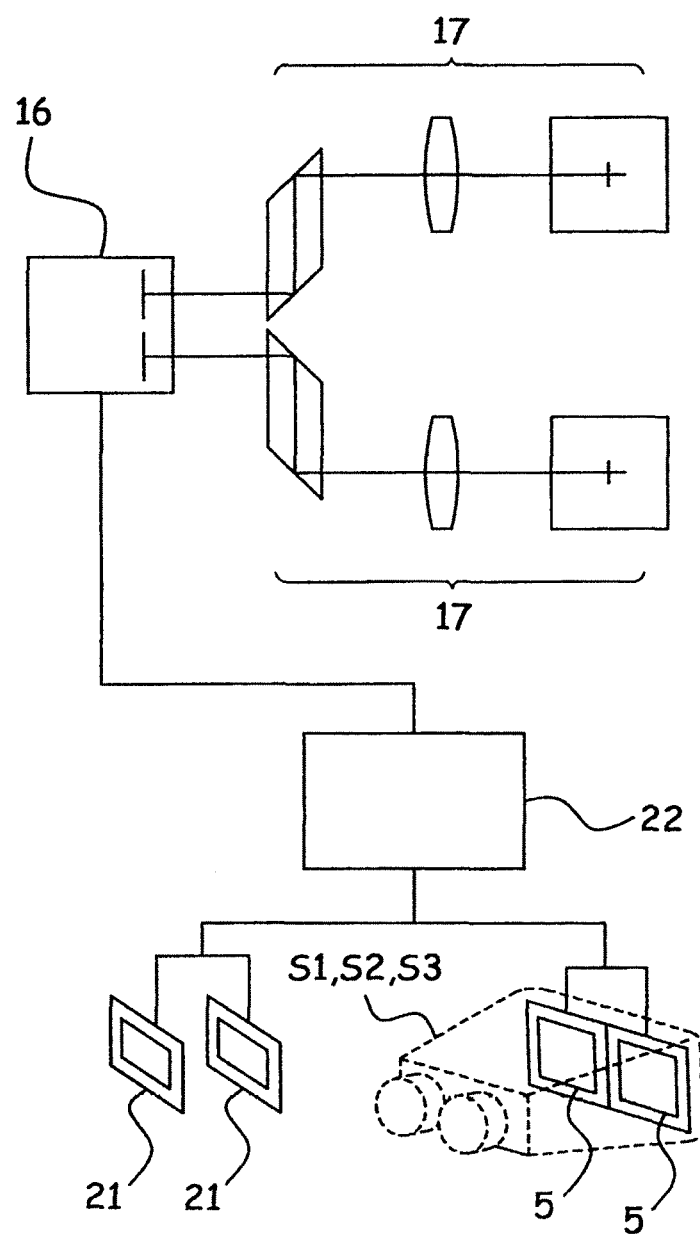
FIG. 18 is a view illustrating a relationship between a camera and monitors.

The small monitors 21 and display monitors 5 of each of the stereo viewers S1 to S3 receive through a controller 22 a pair of left and right electronic images as illustrated in FIG. 18.

<High-Magnification Optical Path C>

From the prisms 9 positioned at the top of the objective optical system 8, the high-magnification optical paths C are formed to bypass the zooming optical system 10 on horizontal outer sides thereof. Namely, the high-magnification optical paths C are branched in a horizontal plane from the prisms 9, are extended rearward, and are selectively connected to the image optical paths B.

In each high-magnification optical path C, there are arranged a pair of front and rear prisms 23, and between them, a high-magnification optical system 24'. The high-magnification optical paths C are formed to be parallel to the normal optical paths A in which the zooming optical system 10 is arranged. The high-magnification optical paths C protrude horizontally outwardly, and therefore, no other optical systems are present around them in top-bottom and left-right directions, to avoid dimensional restrictions, enlarge the diameter M of the high-magnification optical system 24 (refer to FIG. 11), and provide a fixed high magnification of 40 times.

Figure 3:
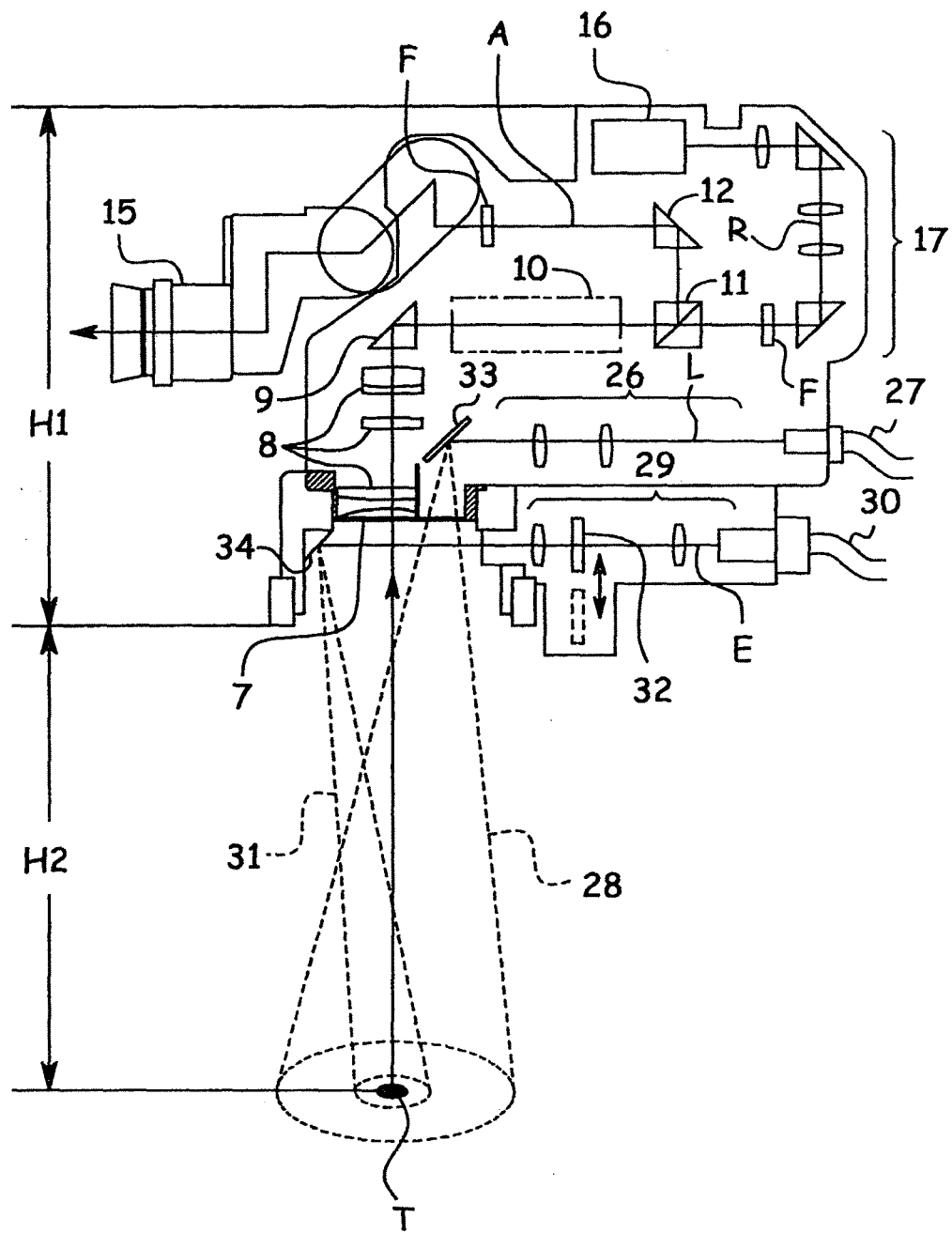
FIG. 3 is a view illustrating an internal structure of the stereomicroscope.
Figure 4:
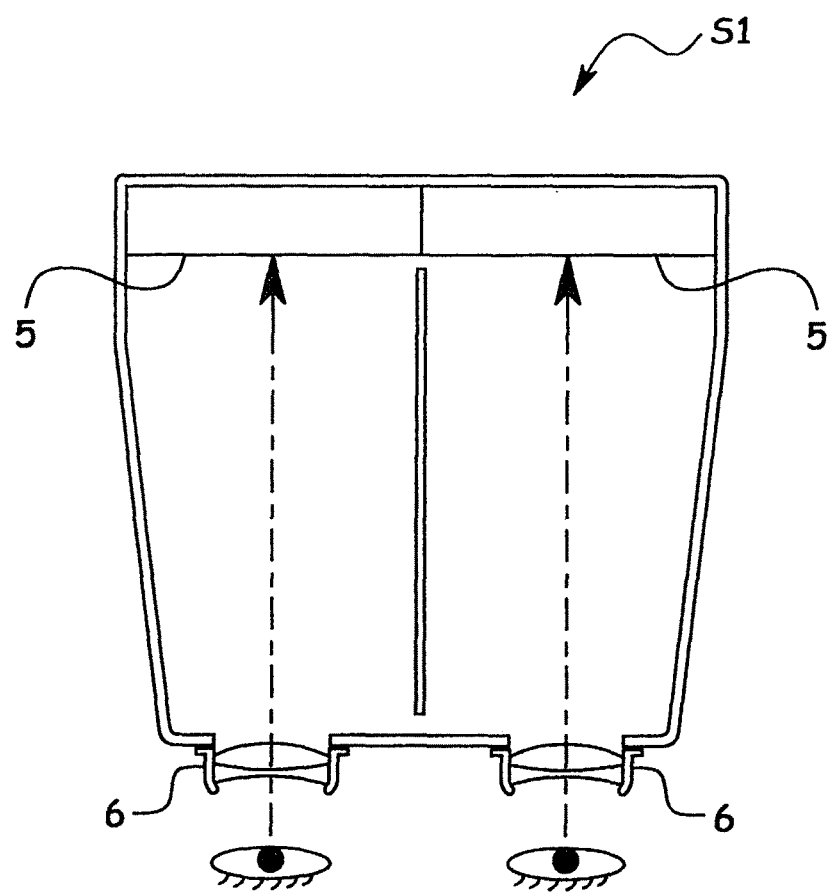
FIG. 4 is a view illustrating an internal structure of the stereo viewer.
Figure 5:
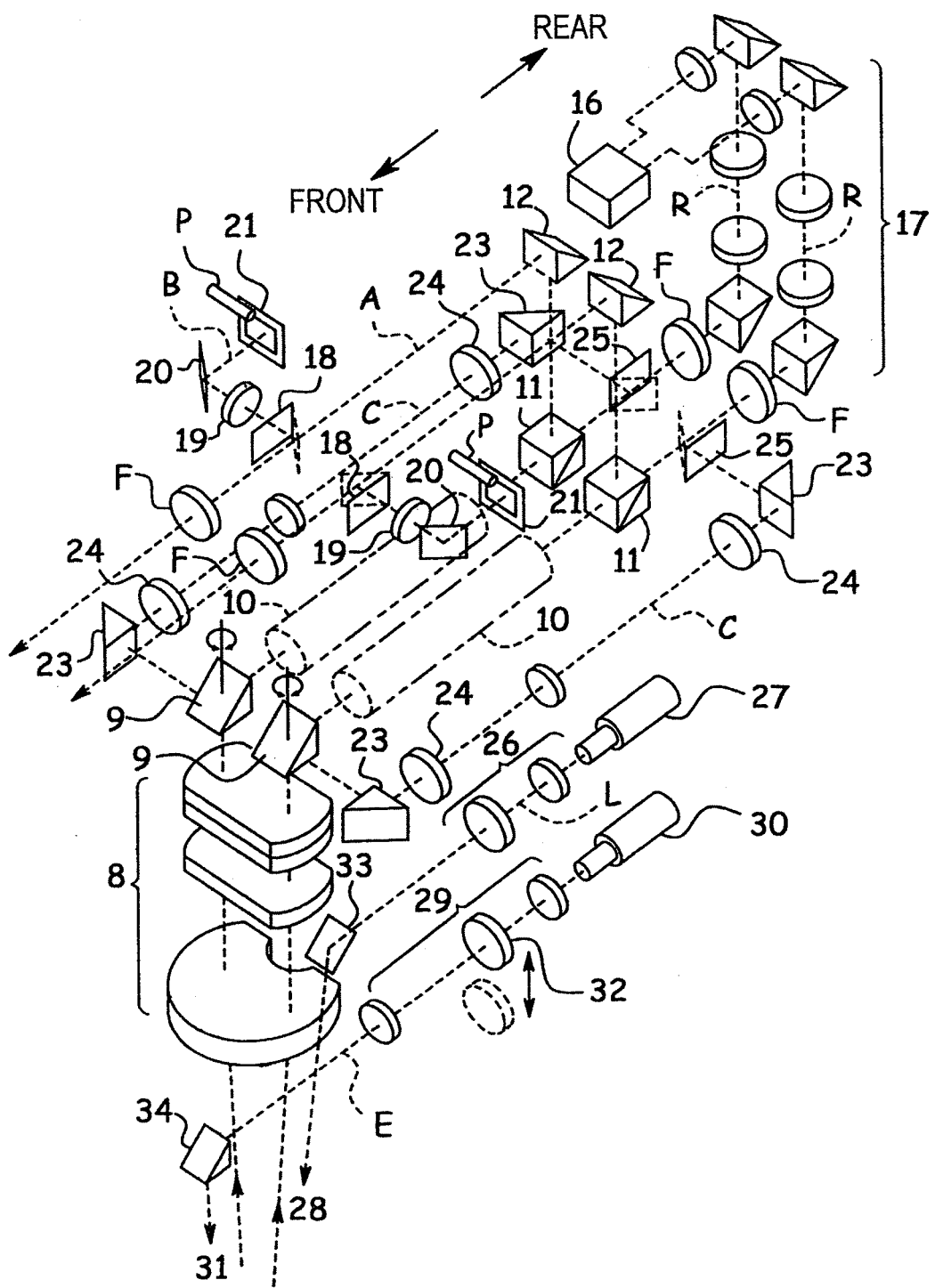
FIG. 5 is a view illustrating all optical paths of the stereomicroscope.

The high-magnification optical paths C are horizontally formed on horizontally outer sides of the zooming optical system 10. Compared with the related art that vertically forms the high-magnification optical paths C and zooming optical system 10, the embodiment can reduce a vertical dimension H1 of the stereomicroscope 3. The normal optical paths A (an optical axis of the zooming optical system 10), the high-magnification optical paths C (the high-magnification optical system 24), and the optical path bending parts thereof are horizontal and parallel to one another. Accordingly, the stereomicroscope 3 can vertically be compact. Namely, as illustrated in FIG. 3, the vertical dimension H1 is reduced to expand a lower work dimension H2, thereby expanding a work space and allowing an operation to be easily carried out.

Behind the zooming optical system 10 between the beam splitters 11 and the photographing optical system 17, the photographing optical paths R contain a "magnification switching element" including rotary mirrors 25 and notch filters F.

The rotary mirrors 25 are similar to those in the image optical paths B and turn around end vertical axes 25V, to freely enter into the normal optical paths A at an angle of 45°. The rotary mirrors are configured only to rotate substantially at the same positions around the end vertical axes 25V, and therefore, are installable in a narrow space in the stereomicroscope 3.

The notch filters F are similar to those arranged in the normal optical paths A and have a characteristic to cut excitation light 31 to be explained later.

<Illumination Optical Path L and Excitation Optical Path E>

Below the zooming optical system 10, there are formed the illumination optical path L and excitation optical path E. Illumination light 28 of, for example, a xenon lamp travels along the illumination optical path L through an illumination optical system 26 and an optical fiber 27. The illumination light 28 widely illuminates the periphery of the target T.

The excitation light 31 of, for example, a laser travels along the excitation optical path E through an excitation optical system 29 and an optical fiber 30. The excitation light 31 narrowly illuminates the periphery of the target T. The excitation light 31 passes through a band-pass filter 32 to transmit a necessary wavelength. The band-pass filter 32 is retractable and is retracted when, for example, a laser treatment is carried out.

The illumination optical path L and excitation optical path E are present behind the objective optical system 8 having a vertical optical axis, and therefore, cause no interference with a working space and allow the stereomicroscope 3 to be made compact.

1. Normal Observation

Figure 6:
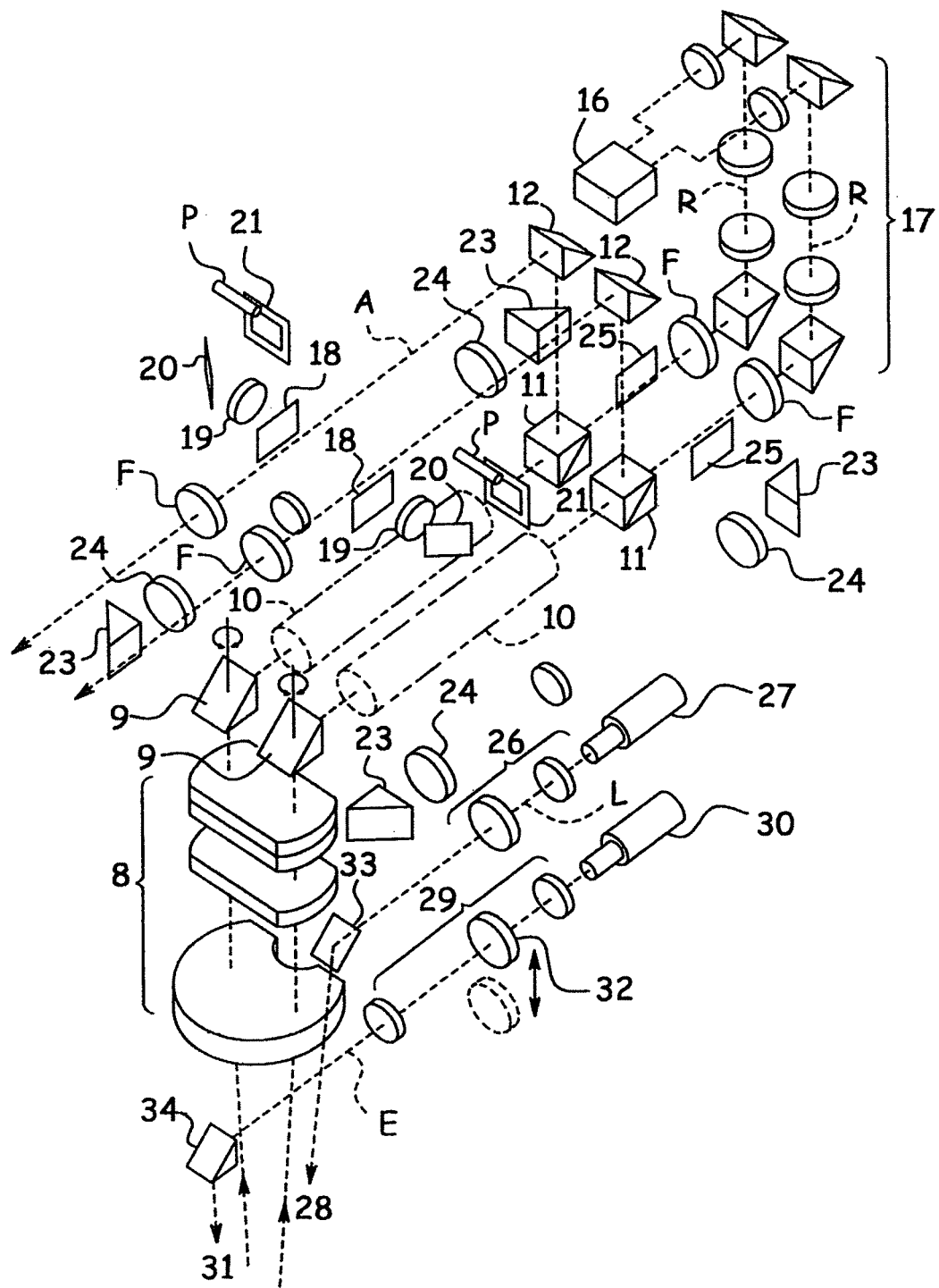
FIG. 6 is a view illustrating a normal optical path of the stereomicroscope.

In the case of a normal observation illustrated in FIG. 6, beams passing through the objective optical system 8 are guided through the normal optical paths A to the pair of left and right eyepieces 15, and therefore, the main operator D1 can stereoscopically observe through the eyepieces 15 an optical image of the target T. Part of the beams is branched and is photographed with the camera 16, and therefore, persons other than the main operator D1 can view an electronic image of the same with the stereo viewers S1 to S3. The optical image seen through the eyepieces 15 may be an image under the illumination light 28 or a fluorescent observation under the excitation light E. In the case of the fluorescent observation, a fluorescent material such as talaporfin sodium and indocyanine green must beforehand be collected at the target. When optically observing fluorescence with the eyepieces 15, it is necessary to dim the operation room because the fluorescence is weak.

If only the assistants D2 and the like using the stereo viewers S1 to S3 conduct the fluorescent observation, the weak fluorescence is observable by adjusting the sensitivity of the camera 16 without dimming the operation room. When observing the fluorescence image with the naked eye or when photographing the same with the camera 16, the excitation light 31 that is unnecessary for the fluorescent observation is removed by the notch filters F in the optical paths, and therefore, a clear fluorescence image is observable and photographable.

2. Image Observation

Figure 7:
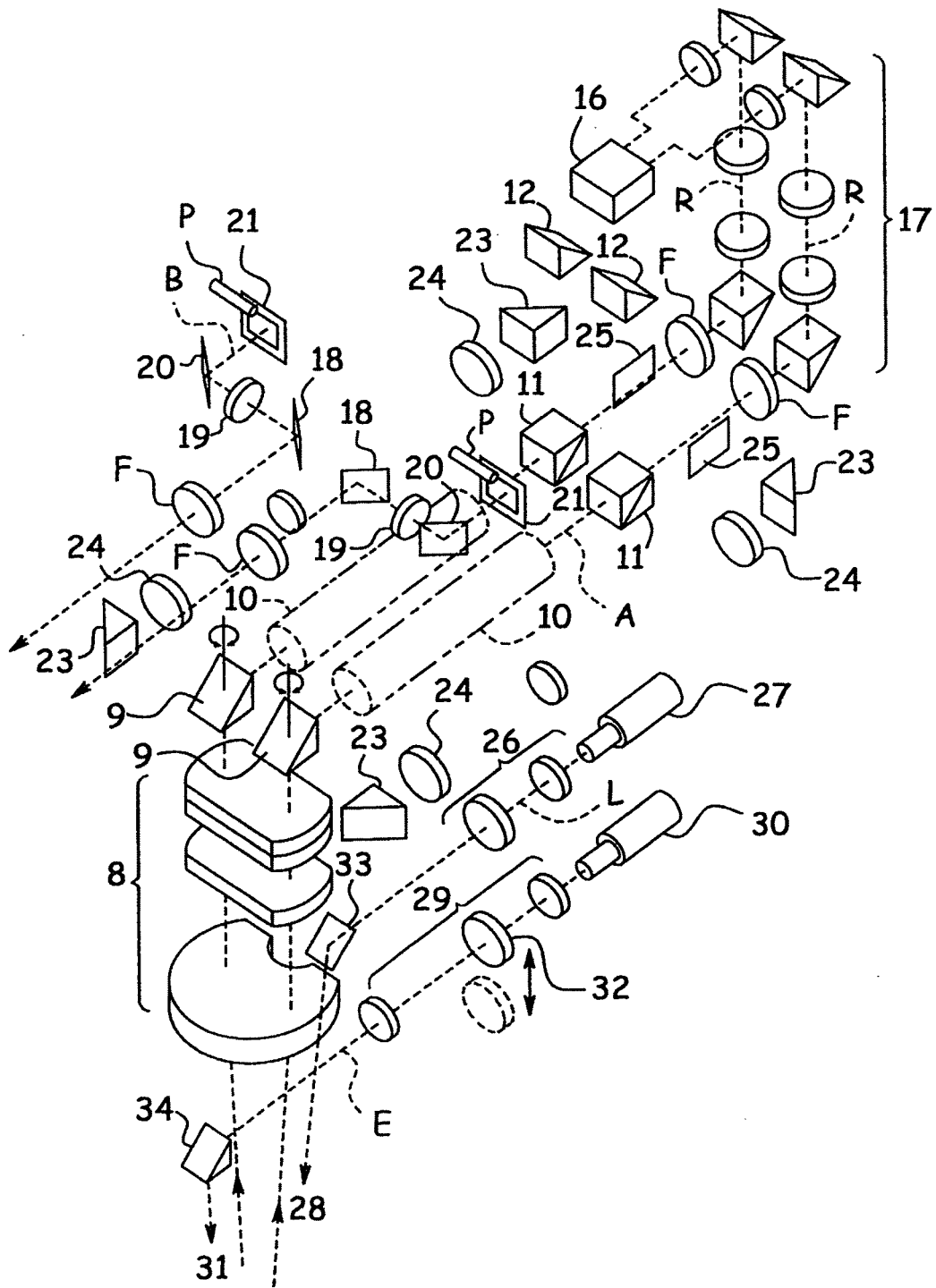
FIG. 7 is a view illustrating an image optical path of the stereomicroscope.

As illustrated in FIG. 7, fluorescence of the target T irradiated with the excitation light 31 is photographed with the camera 16 and an electronic image thereof is displayed on the small monitors 21 in the stereomicroscope 3 and is viewed through the eyepieces 15. In this case, the main operator D1 manipulates a footswitch (not illustrated) or the like, to advance the rotary mirrors 18 into the normal optical paths A and switch the optical paths to the image optical paths B.

Then, the fluorescence image displayed on the small monitors 21 becomes stereoscopically observable through the eyepieces 15. The optical paths are switched through optical total reflection, and therefore, the stereoscopically observable electronic image is bright and clear. The fluorescence is photographed at a sensitivity of the camera 16 that is generally higher than the sensitivity of the naked eye, and therefore, is observable clearer than the normal observation. The sensitivity of the camera 16 is adjustable to observe the fluorescence with a required color tone. Namely, it is observable with a color tone that is optimum for the fluorescent material.

The stereoscopic image observation with the small monitors 21 is not limited to observing fluorescence under the excitation light 31. It is applicable to observing a normal image under the illumination light 28. In this case, the optical paths are 100% switched to others through optical total reflection, to realize a stereoscopic observation of a bright and clear electronic image. In addition, the color tone of an image is adjustable to observe the image with a different color tone from the optical observation. For example, a part to be excised by operation and the other parts may be observable with different color tones that more clearly distinguish them from each other than the macroscopic observation. The observations under the excitation light 31 and illumination light 28 are sharable by persons other than the main operator D1 with the use of the stereo viewers S1 to S3.

As explained above, the optical observation and image observation can be switched from one to another with the eyes being kept on the eyepieces 15, and therefore, there is no need for the main operator D1 to stop the operation for the switching.

3. High-Magnification Image Observation

Figure 8:
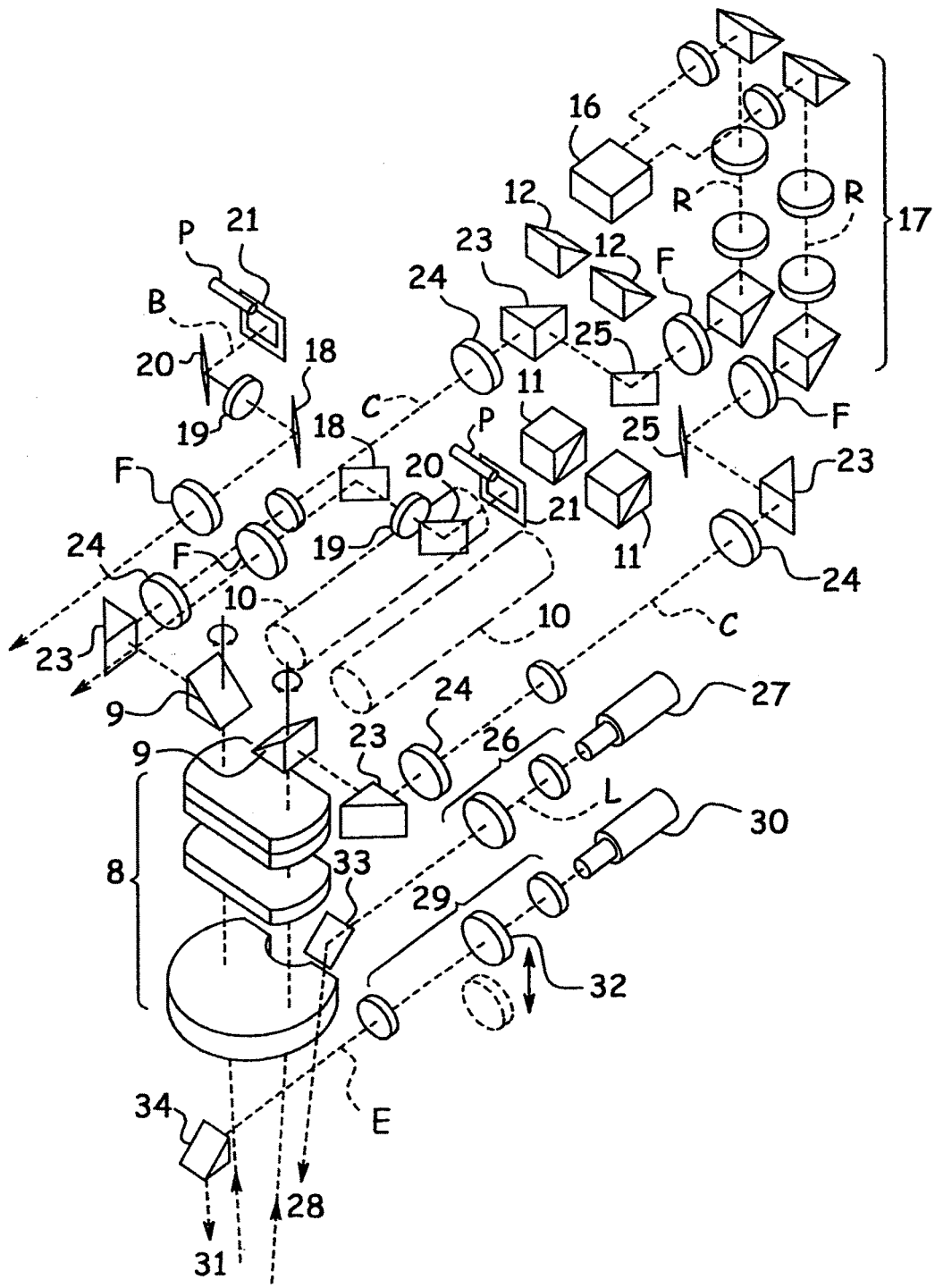
FIG. 8 is a view illustrating a high-magnification optical path of the stereomicroscope.
Figure 9:
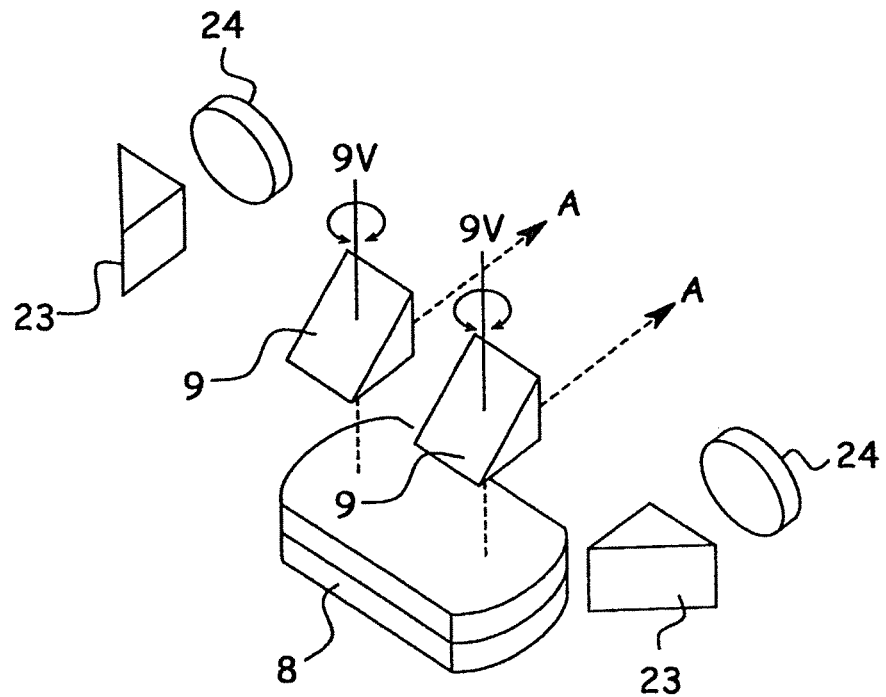
FIG. 9 is a perspective view illustrating prisms turning around virtual vertical axes.
Figure 10:
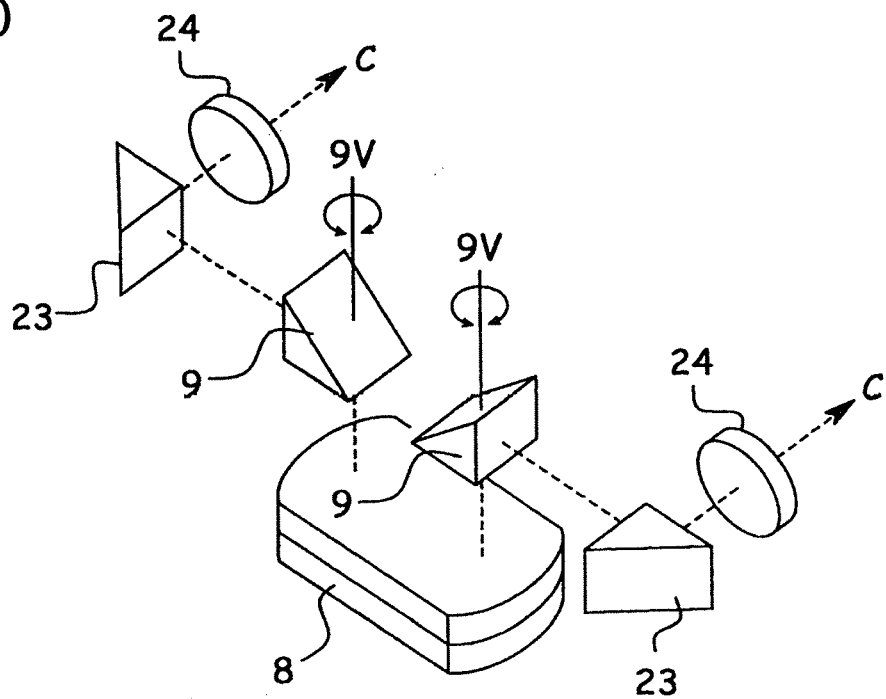
FIG. 10 is a perspective view corresponding to FIG. 9, illustrating the prisms turned.
Figure 11:
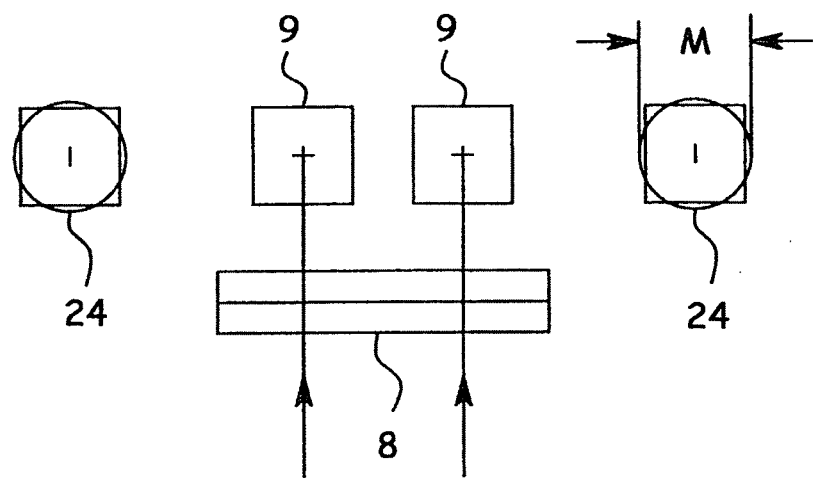
FIG. 11 is a front view illustrating the prisms turning around the virtual vertical axes.
Figure 12:
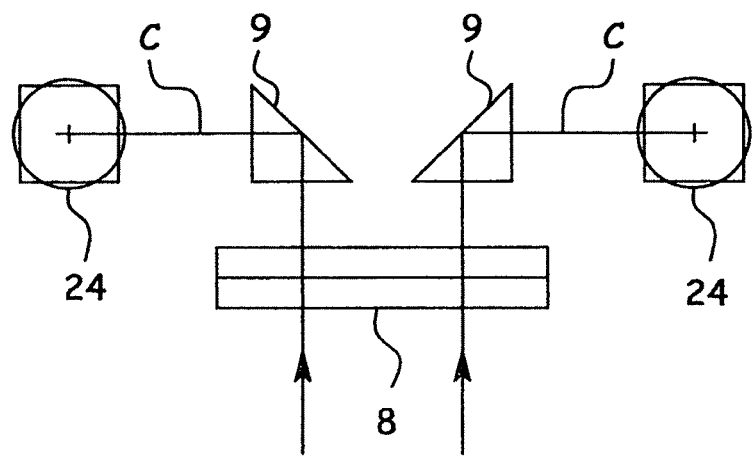
FIG. 12 is a front view corresponding to FIG. 11, illustrating the prisms turned.
Figure 13:
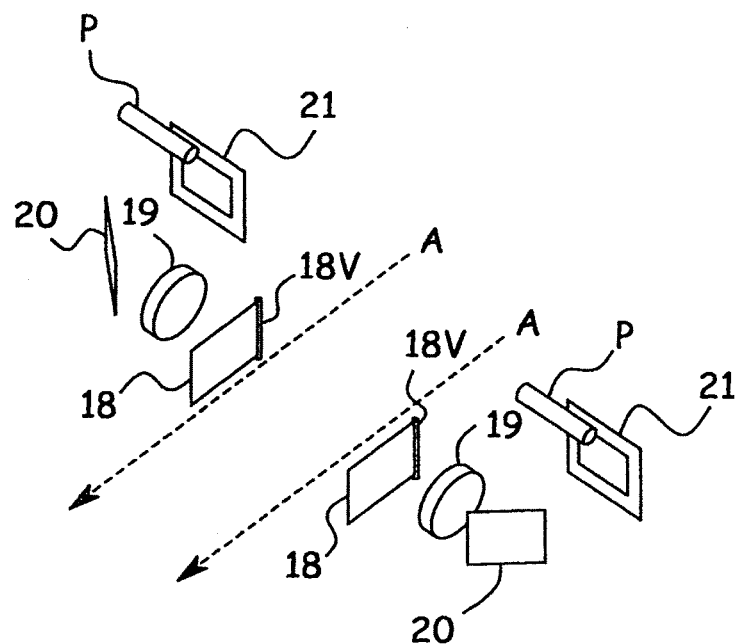
FIG. 13 is a perspective view illustrating rotary mirrors in the image optical path.
Figure 14:
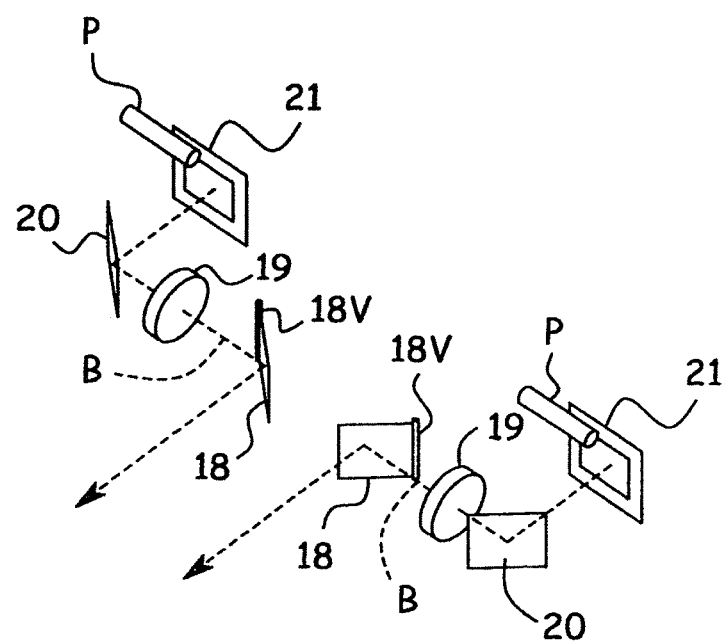
FIG. 14 is a perspective view corresponding to FIG. 13, illustrating the rotary mirrors turned.
Figure 15:
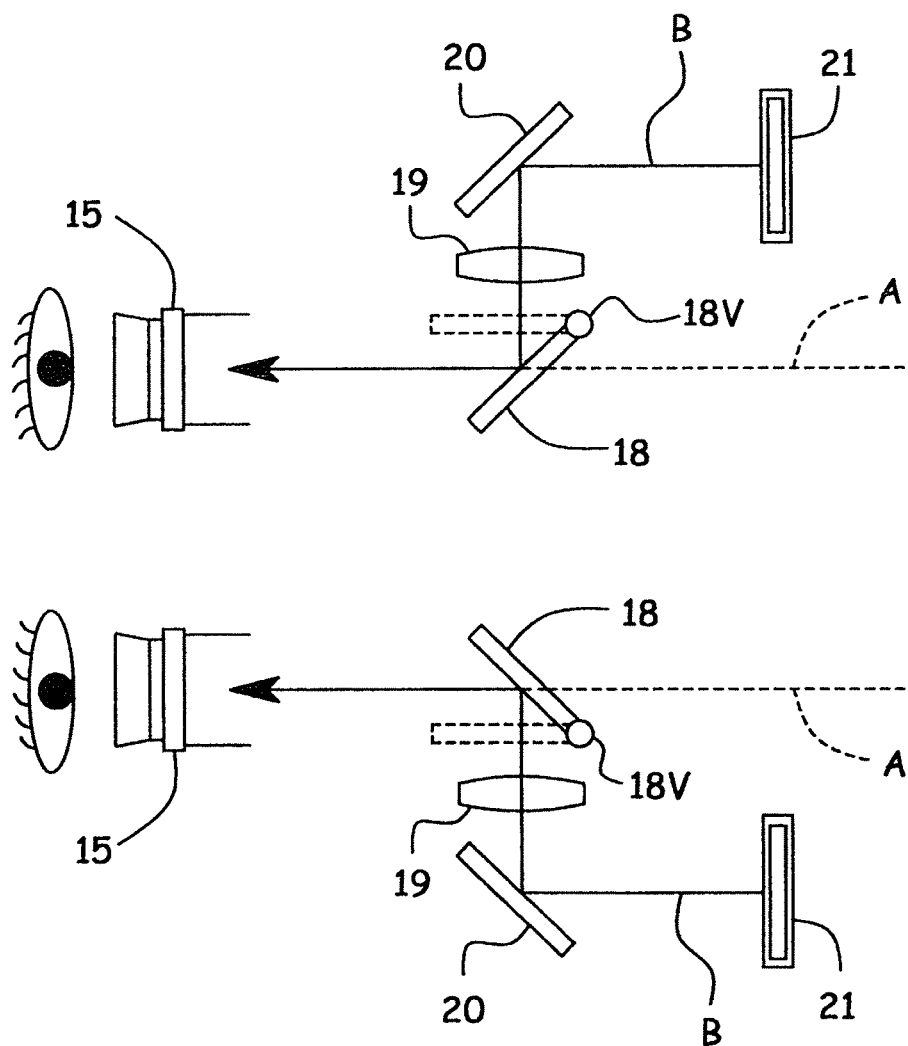
FIG. 15 is a plan view illustrating the image optical path.
Figure 16:
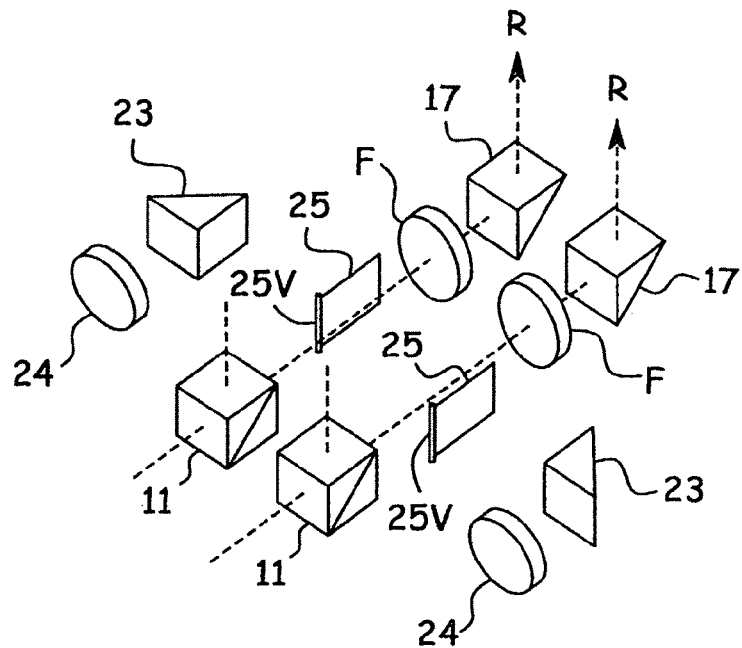
FIG. 16 is a perspective view illustrating rotary mirrors in the high-magnification optical path.
Figure 17:
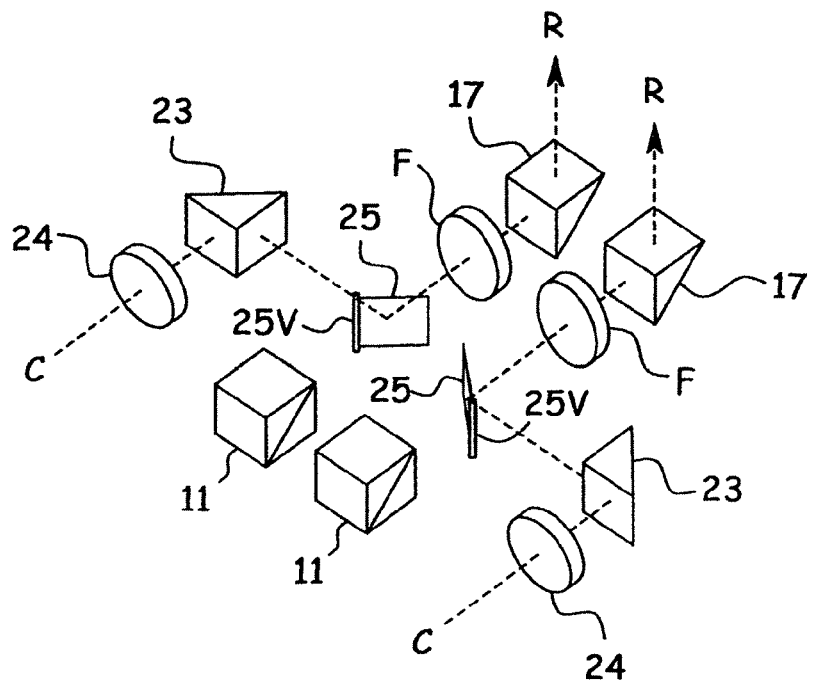
FIG. 17 is a perspective view corresponding to FIG. 16, illustrating the rotary mirrors turned in the high-magnification optical path.

To further enlarge the fluorescence image observation, the optical paths are switched to the high-magnification optical paths C as illustrated in FIG. 8 by outwardly turning the prisms 9 at the top of the objective optical system 8 by 90°, and interlocking with this, by turning the rotary mirrors 25 by 45°.

The high-magnification optical paths C include no zooming optical system 10, and therefore, allow the camera to photograph a clear image at a fixed high magnification. In addition, the switching achieved by the rotary prisms 9 and rotary mirrors 25 100% switches the optical paths to others through optical total reflection, and therefore, the camera 16 can photograph a bright and clear electronic image.

The photographed electronic image can be displayed on the small monitors 21 in the stereomicroscope 3 and on the display monitors 5 of the stereo viewers S1 to S3. The high-magnification optical paths C are not extended to the eyepieces 15, and instead, use the photographing optical paths R and image optical paths B, to save a space.

In particular, the embodiment horizontally outwardly protrudes the high-magnification optical paths C, to increase the diameter M of the lenses constituting the high-magnification optical system 24, thereby improving the resolution and brightness of an electronic image photographed with the camera 16. The high magnification allows the joining of minute blood vessels (a diameter of about 100 μm) and a surgical operation of biotechnologically cultured tissue to be carried out.

The high-magnification image observation is achievable with the fluorescence observation under the excitation light 31 and the normal observation under the illumination light 28. In particular, stereoscopically observing a fluorescence image clearly at high magnification is an epochal event and is greatly expected to contribute to a future medical development.

According to the above-mentioned embodiment, the rotary mirrors 25 are arranged in the photographing optical paths R between the beam splitters 11 and the photographing optical system 17. They may be arranged in the normal optical paths A behind the zooming optical system 10 and just before the beam splitters 11 (the positions of the prisms 23 and high-magnification optical system 24 having to be adjusted according to the rotary mirrors 25). This may somewhat reduce the clearness of an image photographed with the camera 16. It, however, allows a macroscopic observation through the eyepieces 15 to be carried out under the high magnification.

Second Embodiment

Figure 19:
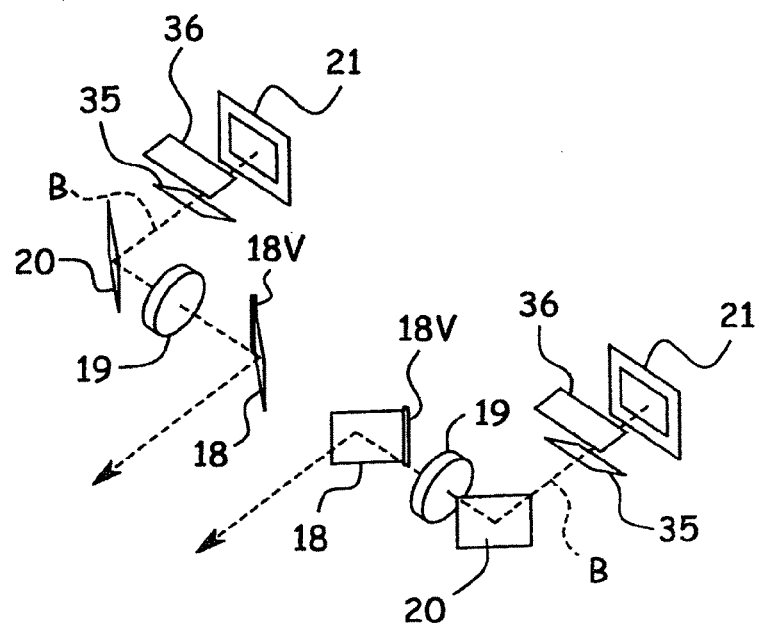
FIG. 19 is a perspective view illustrating rotary mirrors in an image optical path of a stereomicroscope according to a second embodiment of the present invention.
Figure 20:
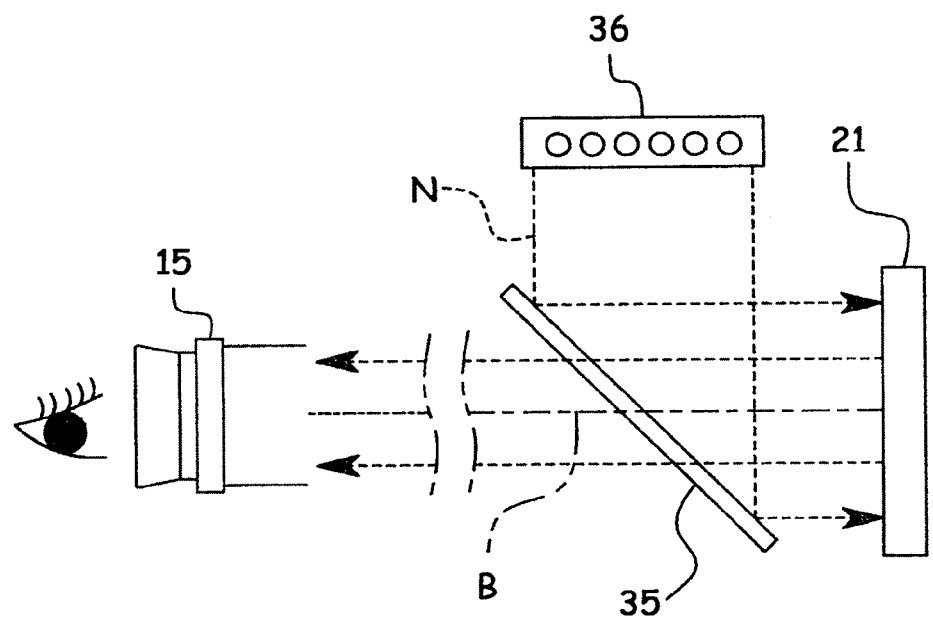
FIG. 20 is a sectional view illustrating the image optical path.

FIGS. 19 and 20 illustrate the second embodiment of the present invention. This embodiment employs structural elements that are similar to those of the first embodiment. However, it differs from the first embodiment in optical elements contained in the image optical paths B. Accordingly, the similar structural elements are represented with common reference marks to omit a repetition of explanations.

According to the present embodiment, arranged in front of a small monitor 21 that is a reflection LCD is a half mirror (beam splitter) 35 having an angle of 45 degrees in a vertical direction with respect to an optical axis. The half mirror 35 splits light at a ratio of 50:50. Above the half mirror 35, there is arranged a surface light source 36 made of white LEDs. The light source P is turned on when the image optical path B is functioned by turning a rotary mirror 18.

The surface light source 36 emits illumination light N straightly to the half mirror 35. The illumination light N is partly reflected by the half mirror 35 and becomes parallel to the optical axis, to vertically hit the small monitor 21. The illumination light N is reflected by the small monitor 21 and advances along the optical axis. Part of the reflected light from the small monitor 21 transmits through the half mirror 35, passes through an eyepiece 15, and reaches a corresponding one of the left and right eyes.

According to this embodiment, the illumination light N from the surface light source 36 is reflected by the half mirror 35 and vertically hits the small monitor 21, to uniformly illuminate the small monitor 21 so that an electronic image on the small monitor 21 is easily viewed.

Effect of Invention

According to the first aspect of the present invention, the total reflection optical element can switch the normal optical path to the image optical path, so that an observer may keep his or her eyes on the eyepieces when switching an optical image through the normal optical path and an electronic image through the image optical path from one to another. The total reflection optical element 100% switches the optical path to another, to allow a bright and clear electronic image to be stereoscopically observed, and therefore, it is appropriate for a fluorescence observation. Since there is no need of removing the eyes from the eyepieces, there is no need of suspending an operation, thereby shortening an operation time.

According to the second aspect of the present invention, the zooming optical system in the normal optical path is horizontally formed and the high-magnification optical path is formed on a horizontal outer side of the zooming optical system, thereby shortening a vertical dimension of the microscope body. The high-magnification optical path horizontally outwardly protrudes, and therefore, the diameter of the magnification lens system can be increased without affecting the vertical size. Accordingly, the second aspect can enlarge the diameter of the magnification lens system, to improve the resolution and brightness of the high-magnification optical path.

United States Designation

In connection with United States designation, this international patent application claims the benefit of priority under 35 U.S.C. 119(a) to Japanese Patent Application No. 2007-320228 filed on Dec. 11, 2007, Japanese Patent Application No. 2007-320229 filed on Dec. 11, 2007, Japanese Patent Application No. 2008-144798 filed on Jun. 2, 2008, and Japanese Patent Application No. 2008-144808 filed on Jun. 2, 2008 whose disclosed contents are cited herein.

The invention claimed is:

1. A stereomicroscope comprising:
   a first optical path configured to guide a pair of left and right beams passing through an objective optical system to left and right eyepieces;
   a photographing optical path branched from the first optical path and extending to a camera that introduces branched beams and photographs a pair of electronic images having binocular parallax;
   an image optical path configured to guide images displayed on a pair of left and right monitors for the left and right eyepieces and configured to display the electronic images photographed by the camera; and
   a total reflection optical element configured to optionally switch the first optical path and image optical path from one to another and guide the chosen one to the eyepieces.

2. The stereomicroscope according to claim 1, wherein:
   the objective optical system is arranged in a front part of the stereomicroscope with an optical axis thereof being vertical; and
   the first optical path horizontally extends away from the optical axis of the objective optical system toward a rear part of the stereomicroscope, is upwardly bent at a position where the photographing optical path is branched, is again bent to horizontally extend toward the optical axis of the objective optical system, and reaches the eyepieces.

3. The stereomicroscope according to claim 1, wherein the total reflection optical element is a rotary mirror that is optionally moved into the first optical path, when moved into the first optical path, a back face of the rotary mirror blocking the first optical path and a reflection face thereof guiding the image optical path to the eyepieces.

4. The stereomicroscope according to claim 1, comprising:
   a zooming optical system horizontally arranged in the first optical path;
   a high-magnification optical path branched from the first optical path and bypassing the zooming optical system, the high-magnification optical path containing a fixed high magnification optical system that is horizontally arranged on a horizontal outer side of the zooming optical system; and
   a magnification switching element configured to optionally switch the beams introduced into the objective optical system between the first optical path and the high-magnification optical path.

5. The stereomicroscope according to claim 4, wherein the magnification switching element is a prism that is freely turnable around a virtual vertical axis.

* * * * *